United States Patent
Shimizu et al.

(10) Patent No.: US 7,087,928 B2
(45) Date of Patent: Aug. 8, 2006

(54) LIQUID CRYSTAL DISPLAY DEVICE

(75) Inventors: Hiromasa Shimizu, Chiba (JP);
Yoshiki Watanabe, Ootaki (JP);
Hironobu Yamada, Mobara (JP);
Masahiro Ohkubo, Mobara (JP);
Takanori Nakayama, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 133 days.

(21) Appl. No.: 10/853,171

(22) Filed: May 26, 2004

(65) Prior Publication Data

US 2004/0252266 A1 Dec. 16, 2004

(30) Foreign Application Priority Data

May 28, 2003 (JP) .............................. 2003-150325

(51) Int. Cl.
*H01L 29/04* (2006.01)

(52) U.S. Cl. ............................ 257/57; 257/59; 349/44; 349/141

(58) Field of Classification Search ................. 257/57
See application file for complete search history.

(56) References Cited

U.S. PATENT DOCUMENTS 5,773,844 A * 6/1998 Kawamura et al. ........... 257/57
6,069,678 A * 5/2000 Sakamoto et al. ........... 349/141
6,781,645 B1 * 8/2004 Kikkawa ...................... 349/44

* cited by examiner

*Primary Examiner*—David Nelms
*Assistant Examiner*—Dao H. Nguyen
(74) *Attorney, Agent, or Firm*—Reed Smith LLP; Stanley P. Fisher, Esq.; Juan Carlos A. Marquez, Esq.

(57) ABSTRACT

The present invention realizes an image display of high quality by eliminating a defective display which is attributed to a stepped portion of a light shielding film which is generated in a boundary region by exposure of two or more times using an exposure mask having a size smaller than a size of a display region. Assuming a width of a scanning line GL as $W_G$, a width of a common line CL as $W_C$, an interval between the scanning line GL and the common line CL as $W_P$, and a width of a light shielding film BM1 as $W_{BM}$, the relationship $W_{BM} < W_G + W_C + W_P$ is established. Further, both end peripheries of the light shielding film BM1 are positioned between an end periphery of the scanning line GL at a side opposite to the common line CL and an end periphery of the common line CL at a side opposite to the scanning line GL.

5 Claims, 9 Drawing Sheets

LIQUID CRYSTAL DISPLAY DEVICE

BACKGROUND OF THE INVENTION

The present invention relates to a liquid crystal display device, and more particularly to a liquid crystal display device which enables a high-quality display by overcoming a display defect attributed to the displacement of a light shielding film at a multiple exposed portion generated when the light shielding film is formed by divided exposure two or more times with 1:1 exposure using an exposure mask smaller than a size of a display region.

As a high-definition color monitor for a computer or other equipment, a liquid crystal display device has been popularly used. The liquid crystal display device is basically configured such that a so-called liquid crystal panel is formed by sandwiching a liquid crystal layer between two (a pair of) substrates at least one of which is formed of a transparent glass or the like. The liquid crystal display device is classified by a driving circuit into a type in which given pixels are turned on and off by selectively applying a voltage to various electrodes for forming pixels which are formed on the substrate of the liquid crystal panel and a type in which the above-mentioned various electrodes and the active elements for pixel selection are formed and given pixels are turned on and off by selecting the active elements.

Particularly, the latter-type liquid crystal display device is referred to as an active-matrix type and forms a main stream of the liquid crystal display device in view of excellent features such as the excellent contrast performance, the rapid display performance and the like. As the active-matrix type liquid crystal display device, there have been known a so-called vertical electric field system in which an electric field which changes the orientation direction of the liquid crystal layer is applied between electrodes formed on one substrate and electrodes formed on another substrate, a so-called lateral electric field system (also referred to as an IPS system) in which the direction that an electric field is applied to the liquid crystal layer is arranged substantially parallel to a substrate surface and the like.

The liquid crystal panel which constitutes the above-mentioned various liquid crystal display device is provided with a pixel circuit formed of active elements, pixel electrodes and the like on a main surface of one of a pair of substrates, color filters of plurality of colors which are defined by a light shielding film (also referred to as a black matrix hereinafter) are provided to a main surface of one substrate or another substrate, and both main surfaces of both substrates are arranged to face each other in an opposed manner and are laminated to each other and the liquid crystal layer is sandwiched in a laminated gap.

In the manufacture the liquid crystal panel for a large-sized liquid crystal display device having a nominal size of 30 inches or more, the reduction of manufacturing cost is limited with respect to an exposure mask having the substantially equal size as a display region of the liquid crystal panel and hence, in many cases, various lines, pixel circuits, or a black matrix and color filters which are formed on the respective substrates are formed by a 1:1 exposure method (proximity exposure) performing the divided exposure of two or more times using an exposure mask smaller than the display region of the liquid crystal panel.

FIG. 11 is an explanatory view for explaining steps of forming a light shielding film by the 1:1 exposure method. Hereinafter, the explanation is made with respect to the IPS type liquid crystal panel as an example in which the black matrix is formed on another substrate (also referred to as a color filter substrate or a CF substrate) of a pair of substrates which constitute a liquid crystal panel. However, the same goes for the TN type liquid crystal panel in which the black matrix and the color filters are formed on one substrate (also referred to as a TFT substrate since thin film transistors are generally used as active elements). When the black matrix is formed on the CF substrate SUB2 by performing the divided exposure twice by the 1:1 exposure method, first of all, as shown in FIG. 11(A), an exposure mask MSK having a X-direction size of an effective exposure region shorter than a lateral-direction (X) size of the CF substrate SUB2 on which a photosensitive black matrix material is applied is used. In the drawing, the effective exposure region which constitutes the display region is indicated by a drawing pattern BP of the black matrix. Here, the black matrix which defines the respective color pixels in an X-direction is omitted from the drawing.

Figure 11A:
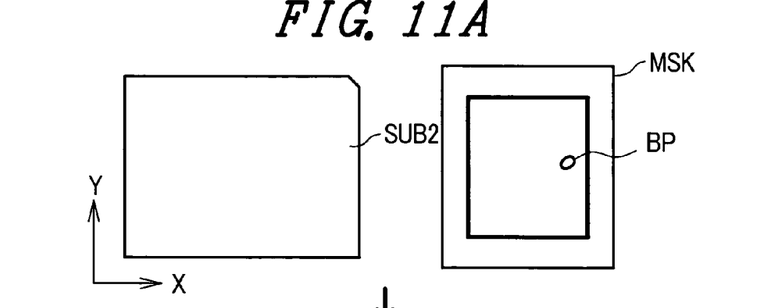
FIG. 11 is an explanatory view for explaining procedures for forming a light shielding film by an 1:1 exposure method.
Figure 11B:
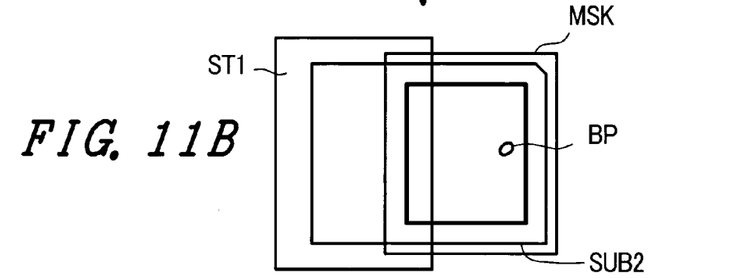
Figure 11C:
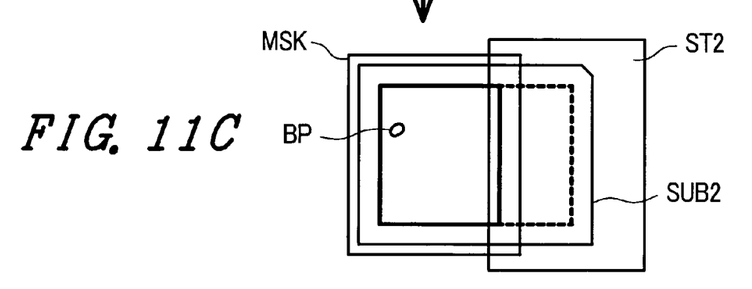

In FIG. 11(B), the CF substrate SUB2 is mounted on a stage (not shown in the drawing) of an exposure machine, the exposure mask MSK is placed on one half of the CF substrate SUB2, another half and an outer peripheral portion which constitutes a picture frame in a product are covered with a shutter ST1 and, thereafter, the first exposure is performed. Here, the shutter ST1 is arranged to cover also a portion of the drawing pattern BP of a boundary portion of the region to be exposed.

Next, the stage is moved to position the exposure mask MSK on another half side of the CF substrate SUB2, wherein one half and the outer peripheral portion which constitutes the picture frame in the product which are exposed by the first exposure are covered with a shutter ST2 and the second exposure is performed. Also in this case, the shutter ST2 is arranged to cover by forming a multiply-exposed portion of several mm, for example, in a direction such that the a portion of the drawing pattern BP at a boundary portion of a post-exposed region is connected (FIG. 11(C)).

Figure 11D:
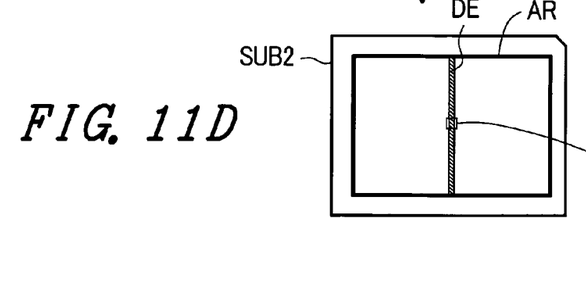
Figure 11E:
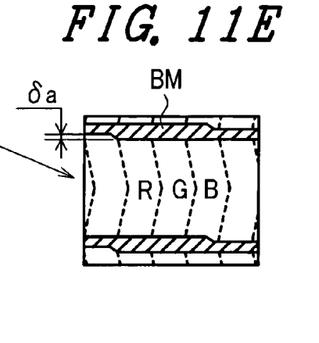

As shown in FIG. 11(D), the drawing pattern is exposed in a given region AR of the CF substrate SUB2. The drawing pattern is developed and is baked to obtain the black matrix BM. The obtained black matrix BM generates an error δa which is displaced in the vertical direction (Y) in the drawing at a position of a multiply-exposed portion DE having a width of several μm (for example, ±5 μm) depending on the accuracy of the movement of the stage of the exposure machine (FIG. 11(E)). Here, R, G, B in FIG. 11(E) respectively indicate pixel regions on which red, green and blue color filters are formed (sub pixels, a color pixel being constituted of three sub color pixels of R, G, B in a color display).

Here, as a literature which discloses the liquid crystal display device of this type, Y. M. Tak, et al "SID 02 DIGWST" pp. 1281–1283 "48.2 Panel Design & Simulation of 40-in. TFT-LCD (literature 1) can be named.

BRIEF SUMMARY OF THE INVENTION

Figure 12:
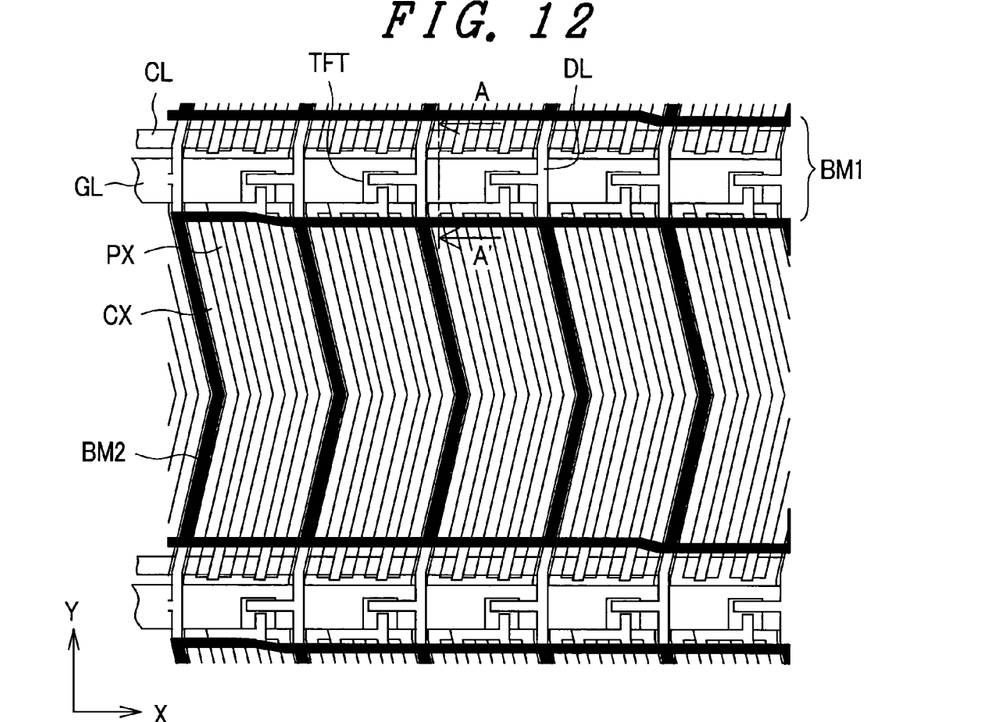
FIG. 12 is a plan view of an essential part showing an example of a shape of a black matrix in a conventional liquid crystal panel in a state that a TFT substrate is observed from the CF substrate side.
Figure 13:
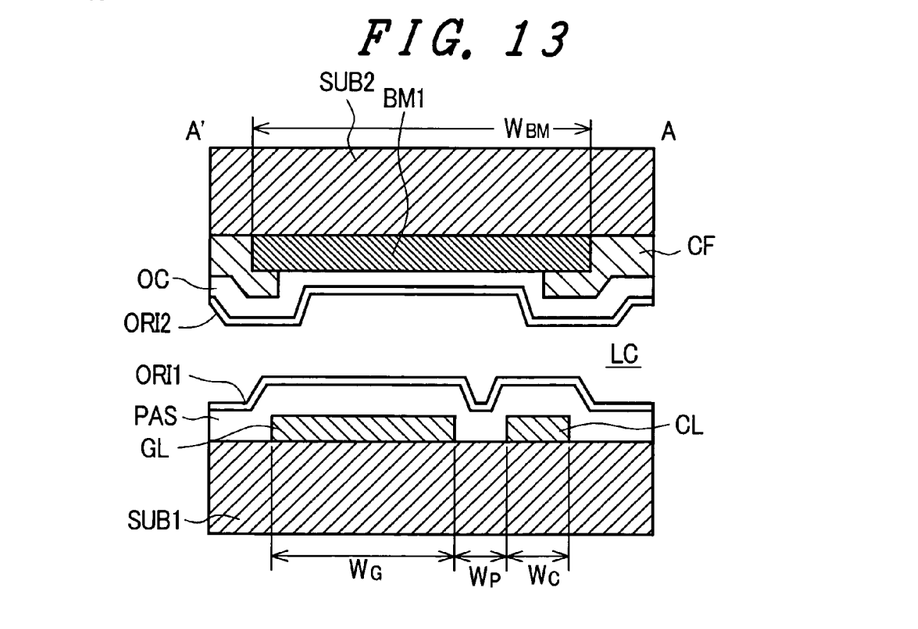
FIG. 13 is a cross-sectional view taken along a line A–A' in FIG. 12.

In this manner, as a result of performing the 1:1 exposure twice or more, a stepped portion is generated in the black matrix in the Y direction. This phenomenon is explained more specifically. FIG. 12 is a plan view showing an essential part of an example of a shape of a black matrix of a conventional liquid crystal panel in a state that a TFT substrate is viewed from a CF substrate side, and FIG. 13 is a cross-sectional view taken along a line A–A' in FIG. 12. In the liquid crystal panel, a type in which scanning lines and common lines CL are arranged adjacent to and are formed in parallel to each other. In FIG. 12, reference symbol GL indicates the scanning lines, reference symbol DL indicates signal lines, reference symbol CL indicates common lines, reference symbol PX indicates pixel electrodes, reference symbol CX indicates common electrodes, reference symbols BM1, BM2 indicate first and second black matrixes, and reference symbol TFT indicates thin film transistors which constitute active elements. Here, the black matrix BM1 is formed over the scanning lines GL and the common lines CL at the CF substrate B2 side. The second black matrix BM2 defines color filters in each pixel PX. Further, in FIG. 13, reference symbol SUB1 indicates a TFT substrate, reference symbol PAS indicates an insulation layer, reference symbol ORI1 indicates an orientation film at the TFT substrate side, SUB2 indicates a CF substrate, reference symbols BM1, BM2 indicate first and second black matrixes, reference symbol CF indicates color filters, reference symbol OC indicates an overcoat layer (a leveling layer), reference symbol ORI2 indicates an orientation film at the CF substrate side, and reference symbol LC indicates a liquid crystal layer.

Here, an attention is focused on the first black matrix BM1 which is positioned over the scanning signal line GL and the common line CL. Each pixel is constituted of a pixel circuit, wherein the pixel circuit is constituted of the thin film transistor TFT which is provided to an intersecting portion of the scanning line GL and the signal line DL, the pixel electrode PX which is driven by the thin film transistor TFT, and the common electrode CX which is connected to the common line CL. As shown in FIG. 13, the conventional black matrix (the first black matrix) BM1 is configured to completely cover the scanning line GL and the common line CL which are provided to the TFT substrate SUB1. That is, assuming a width of the first black matrix B1 in the Y direction as $W_{BM}$, a width of the signal line GL in the Y direction as $W_G$, a width of the common line CL in the Y direction as $W_C$, and an interval between of the signal line GL and the common line CL in the Y direction as $W_P$, the relationship $W_{BM} > W_G + W_C + W_P$ is established.

Figure 14:
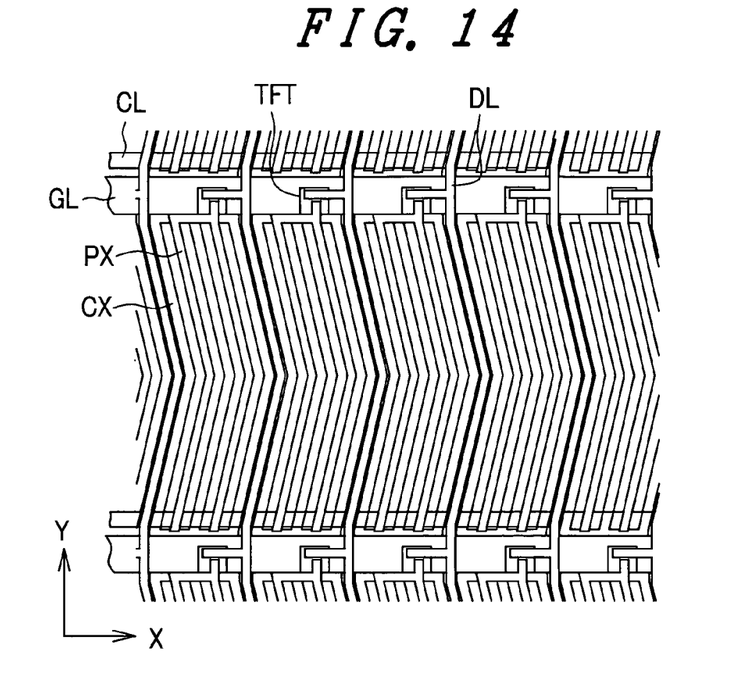
FIG. 14 is a plan view of an essential part of a main surface of the TFT substrate which constitutes the conventional liquid crystal panel shown in FIG. 12.
Figure 15:
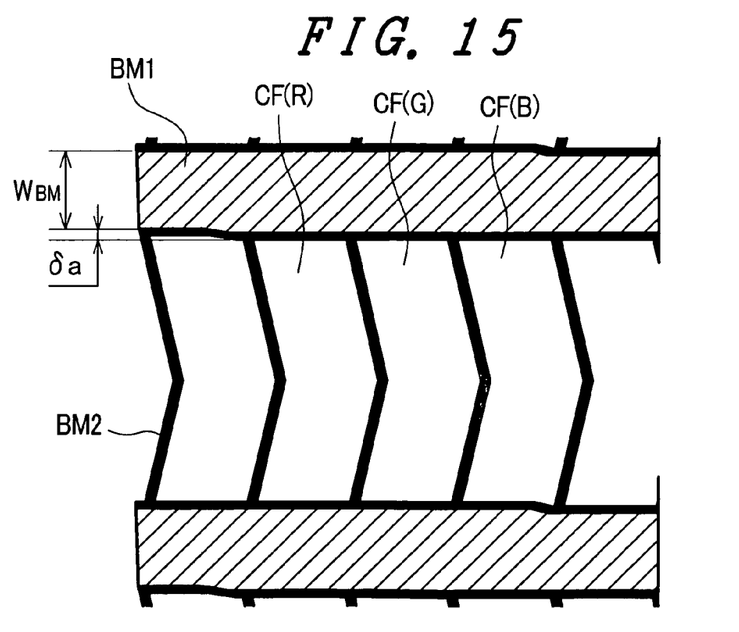
FIG. 15 is a plan view of an essential part of a multiply-exposed portion corresponding to FIG. 11(E) of a main surface of a CF substrate which constitutes the conventional liquid crystal panel shown in FIG. 12.

FIG. 14 is a plan view of an essential part of a main surface of the TFT substrate which constitutes the conventional liquid crystal panel shown in FIG. 12. Further, FIG. 15 is a plan view of an essential part of a multiply-exposed portion corresponding to FIG. 11(E) of the main surface the CF substrate which constitutes the conventional liquid crystal panel shown in FIG. 12. In FIG. 14, the thin film transistor is arranged at an intersecting portion of the scanning line GL and the signal line DL thus forming the pixel. In this example, the common line CL is arranged close to the scanning line GL. In each pixel, the comb-shaped pixel electrode PX which is driven by the thin film transistor TFT and the common electrodes CX which extend from the common line CL are arranged in a meshed manner and a display is performed by changing the transmission of light of every pixel by controlling the orientation of liquid crystal molecules which constitute the liquid crystal layer by an electric field generated between the pixel electrode PX and the common electrode CX.

As described above, the black matrix which is formed in the CF substrate SUB2 is constituted of the first black matrix BM1 (portion indicated by hatching) which shields upper layers of the scanning line GL and the common line CL from light and second black matrix BM2 (portion indicated by a black bold line) which performs shielding of light among the color pixels of three colors (respective color sub pixels) CF(R), CF(G) and CF(B). Further, the width $W_{BM}$ in the Y direction of the first black matrix BM1 is set to a size which allows the first black matrix BM1 to completely cover the scanning line GL and the common line CL in the widthwise direction (Y direction). Accordingly, when there exists the displacement δa shown in FIG. 15 in the multiple exposure region of the boundary portion attributed to the above-mentioned divided exposure, a shape of the portion differs in the X direction between the neighboring pixel regions and hence, a linear zigzag shape is generated attributed to the continuation of the displaced portions in the Y direction.

In this manner, the above-mentioned displacement (error) δa of the first black matrix B1 forms a stepped portion in an opening region of the pixel and hence, a display pattern is deformed whereby the multiply-exposed portion DE shown in FIG. 11(D) is observed as a display defect which is formed on a screen as a continuous line which extends in the longitudinal direction. Although the explanation is made heretofore with respect to the liquid crystal display device which uses the IPS type liquid crystal panel in which the common lines are arranged adjacent to the scanning lines, a similar stepped portion is generated in an IPS type liquid crystal panel which arranges a common line between scanning lines (that is, forming the common line in a pixel) or in a liquid crystal panel having a sheet-like common line. Further, a similar stepped portion is generated in a known TN type liquid crystal panel.

Accordingly, it is an object of the present invention to provide a liquid crystal display device which can realize an image display of high quality by overcoming such display defects.

To achieve the above-mentioned object, the present invention is characterized in that a display defect due to a stepped portion at a multiply-exposed portion of a light shielding film (a first black matrix) formed by multiple exposure of two or more times in a 1:1 exposure is prevented by using lines on a TFT substrate as a light shielding means. Representative features of the present invention are as follows.

The liquid crystal display device of the present invention includes a liquid crystal panel which sandwiches a liquid crystal layer between a pair of substrates which is formed of one substrate and the other substrate, and a drive circuit which displays an image on the liquid crystal panel. Further, on a main surface of one substrate of the pair of substrates, a plurality of pixels are formed, wherein the pixels are constituted of signal lines which extend in the first direction and are arranged in parallel in the second direction which intersects the first direction, scanning lines which extend in the second direction and are arranged in parallel in the first direction, signal lines which extend in the first direction and are arranged in parallel in the second direction, common lines which are formed in parallel with the scanning lines, and pixel circuits which are formed on respective intersecting portions of the signal lines and the scanning lines. The pixel circuit includes an active element, pixel electrodes which are driven by the active elements and a common electrode which is arranged to face the pixel electrode in an opposed manner and is connected with the common line.

The common lines are arranged close to the scanning lines, and on a main surface of the other substrate of the pair of substrates which faces a main surface of one substrate in an opposed manner, alight shielding film (a black matrix) and color filters of a plurality of colors which are defined by the light shielding film are formed. Further, the light shielding film includes first light shielding portions (a first black matrix) which extend in the extending direction of the scanning lines and are positioned above the scanning lines and the common line, and second light shielding portions (a second black matrix) which extend in the extending direction of the signal lines and are positioned between the color filters of the plurality of colors, and assuming a width of the scanning line as $W_G$, a width of the common line as $W_C$, an interval between the scanning line and the common line as $W_P$, and a width of the first light shielding film as $W_{BM}$, the relationship $W_{BM} < W_G + W_C + W_P$ is established.

Further, in the present invention, both end peripheries of the first light shielding film are positioned between an end periphery of the scanning line at a side opposite to the common line and an end periphery of the common line at a side opposite to the scanning line.

According to the present invention, in the above-mentioned respective constitutions, the pixel electrode which constitutes the pixel is formed in a comb shape which extends in the extending direction of the signal line and the common electrode which constitutes the pixel is formed in a comb shape which extends adjacent to and in parallel with the pixel electrode. Here, it is preferable that the active element is formed of a thin film transistor.

Still further, according to the present invention, on a main surface of one substrate of the pair of substrates, signal lines which extend in the first direction and are arranged in parallel in the second direction which intersects the first direction, scanning lines which extend in the second direction and are arranged in parallel in the first direction, signal lines which extend in the first direction and are arranged in parallel in the second direction, common lines which are formed in parallel with the scanning lines, and pixel circuits which are formed on respective intersecting portions of the signal lines and the scanning lines are formed.

The pixel circuit includes an active element, pixel electrodes which are driven by the active elements and a common electrode which is arranged to face the pixel electrode in an opposed manner and is connected with the common line. The common line is arranged between the plurality of scanning lines. On a main surface of the other substrate of the pair of substrates which faces a main surface of one substrate in an opposed manner, a light shielding film (a black matrix) and color filters of a plurality of colors which are defined by the black matrix are formed. Further, the light shielding film includes first light shielding portions (a first black matrix) which extend in the extending direction of the scanning lines and are positioned above the scanning lines, and second light shielding portions (a second black matrix) which extend in the extending direction of the signal lines and are positioned between the color filters of the plurality of colors, and assuming a width of the scanning line as $W_G$, a width of the common line as $W_C$, and a width of the first light shielding film as $W_{BM}$, the relationship $W_{BM} < W_G$ is established.

Further, in the present invention, both end peripheries of the first light shielding film are positioned between both end peripheries of the scanning line.

According to the present invention, in the above-mentioned respective constitutions, the pixel electrode which constitutes the pixel is formed in a comb shape which extends in the extending direction of the signal line and the common electrode which constitutes the pixel is formed in a comb shape which extends adjacent to and in parallel with the pixel electrode. Here, it is preferable that the active element is formed of a thin film transistor.

Here, it is needless to say that the present invention is not limited to the above-mentioned constitutions and constitutions which are described in embodiments described later and the present invention is applicable to a liquid crystal display device which uses a TN type liquid crystal panel and other types of liquid crystal panel. For example, the present invention is also applicable to a liquid crystal display device having sheet-like common electrodes.

DETAILED DESCRIPTION OF THE INVENTION

Figure 1:
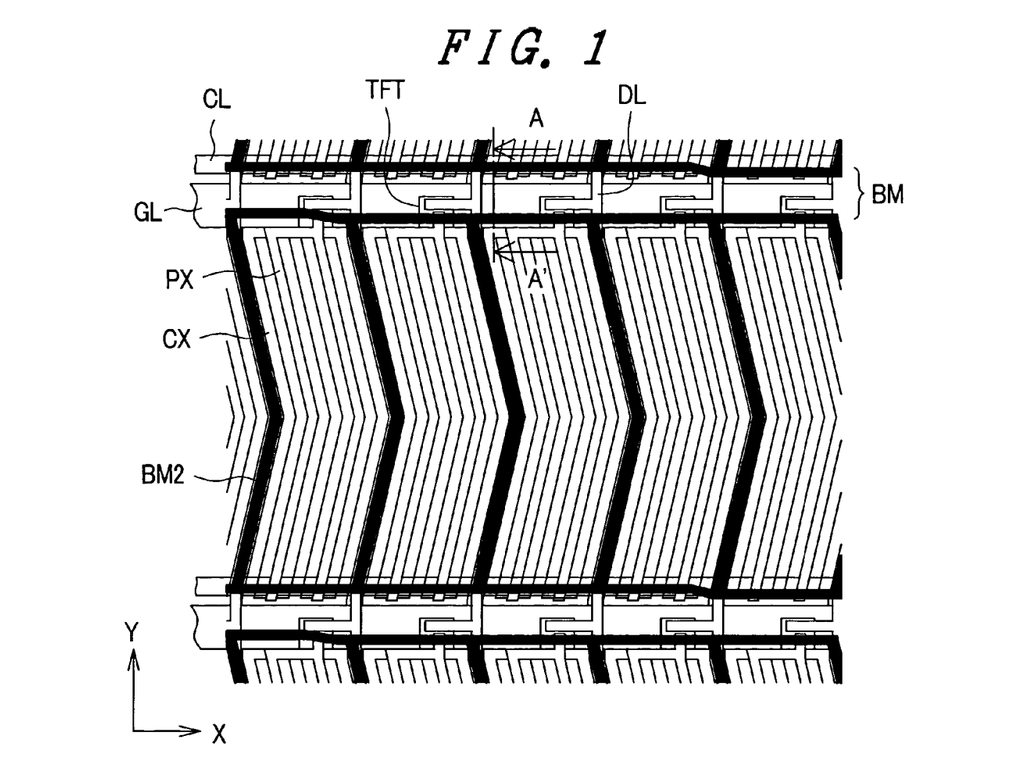
FIG. 1 is a plan view of an essential part showing an example of a shape of a black matrix in a liquid crystal panel which constitutes a liquid crystal display device of the first embodiment according to the present invention in a state that a TFT substrate is observed from a CF substrate side.
Figure 2:
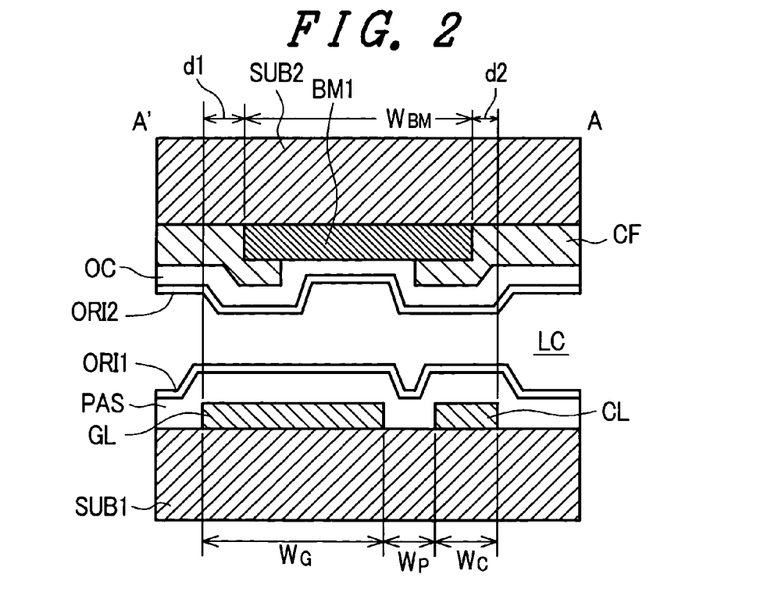
FIG. 2 is a cross-sectional view taken along a line A–A' in FIG. 1.

Hereinafter, embodiments according to the present invention are explained in detail in conjunction with drawings showing the embodiments. FIG. 1 is a plan view of an essential part showing an example of a shape of a black matrix in a liquid crystal panel which constitutes the liquid crystal display device of the first embodiment according to the present invention in a state that a TFT substrate is observed from a CF substrate side and FIG. 2 is a cross-sectional view taken along a line A–A' in FIG. 1. The liquid crystal panel adopts a method in which scanning lines and common lines CL are formed adjacent to each other and in parallel. Reference symbols used in FIG. 1 and FIG. 2 which are as same as the reference symbols in FIG. 12 and FIG. 13 indicate identical functional parts.

The liquid crystal panel adopts the method in which, as explained in conjunction with FIG. 12 and FIG. 13, the scanning lines GL and the common lines CL are formed close to each other and in parallel in the X direction. As black matrixes, a first black matrix BM1 which is positioned above the scanning lines GL and the common lines CL and a second black matrix BM2 which defines between respective color pixels in the X direction are provided.

Figure 3:
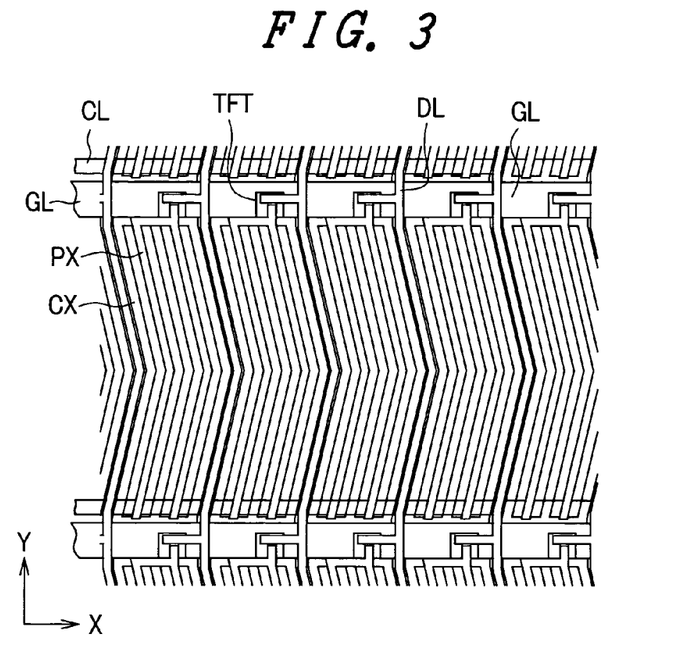
FIG. 3 is a plan view of an essential part of a main surface of the TFT substrate which constitutes the liquid crystal panel shown in FIG. 1.
Figure 4:
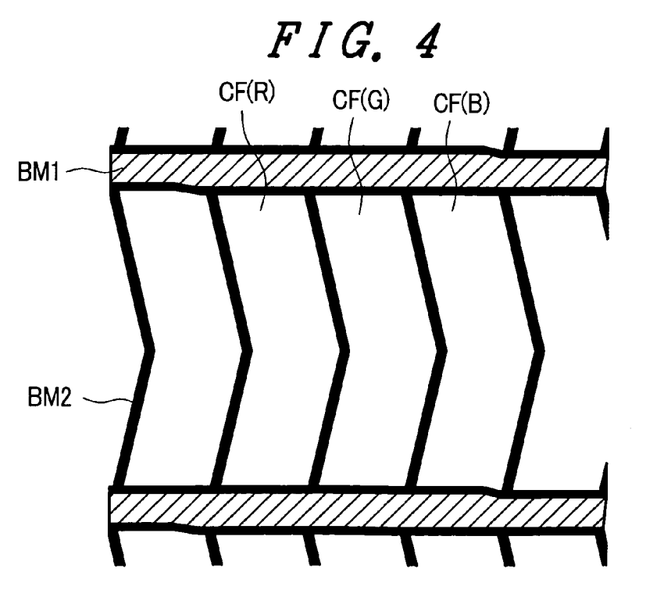
FIG. 4 is a plan view of an essential part of a multiply-exposed portion similar to a multi-exposure portion shown in FIG. 15 of a main surface of a CF substrate which constitutes the liquid crystal panel shown in FIG. 1.

FIG. 3 is a plan view of an essential part of the main surface of the TFT substrate which constitutes the liquid crystal panel shown in FIG. 1. Further, FIG. 4 is a plan view of an essential part of multiply-exposed portion similarly as in FIG. 15 of the main surface of the CF substrate which constitutes the liquid crystal panel shown in FIG. 1. In FIG. 3, a pixel is constituted such that a thin film transistor TFT is arranged at a portion where the scanning line GL and the signal line DL intersect. In this example, in the vicinity of the scanning line GL, the common line CL is arranged. In each pixel, comb-shaped pixel electrodes PX which are driven by the thin film transistor TFT and common electrodes CX which extend from the common line CL are alternately arranged. By controlling the orientation of liquid crystal molecules constituting the liquid crystal layer using an electric field generated between the pixel electrodes PX and the common electrodes CX, the light transmission for every pixel is changed and the display is performed.

Similarly as mentioned above, the black matrixes which are formed on the CF substrate SUB2 are constituted of a first black matrix BM1 (portion indicated by hatching) which shields the upper layers of the scanning line GL and the common line CL from light and a second black matrix BM2 (a portion indicated by a black bold line) which shields portions defined between three color pixels (respective color sub-pixels) CF(R), CF(G), CF(B) each other. The width of the first black matrix BM1 in the Y direction according to this embodiment is narrower than FIG. 15 of the width of the first black matrix BM1 in the Y direction.

In this embodiment, assuming a width of the first black matrix B1 as $W_{BM}$, a width of the signal line GL as $W_G$, a width of the common line CL as $W_C$, and an interval between the signal line GL and the common line CL as $W_P$, the relationship $W_{BM} < W_G + W_C + W_P$ is established. As shown in FIG. 2, the first black matrix BM1 is formed narrower than the width in the Y direction of the scanning line GL and the common line CL provided to the TFT substrate SUB1. Accordingly, a boundary of a pixel in the Y direction between the scanning lines GL arranged adjacent to each other in the Y direction is defined by end peripheries of the scanning line GL and the common line CL. Accordingly, even when a stepped portion is generated in the Y direction in the boundary region which is subjected to the multiple exposure, the stepped portion is concealed by the scanning line GL or the common line CL. Therefore, the stepped portion formed linearly in the prior art is not recognized.

The relationship of the first black matrix BM1 which is defined by the end peripheries of the scanning line GL and the common line CL is set to $W_{BM} < W_G + W_C + W_P$, as described above. However, to be more specific, it is necessary that the end periphery of the first black matrix BM1 does not project from the end peripheries of the scanning line GL and the common line CL. That is, the both peripheral ends of the first black matrix BM1 are arranged between the end periphery of the scanning line GL at a side opposite to the common line CL and the end periphery of the common line CL at a side opposite to the scanning line GL. Hereinafter, a specific example of the relationship of the scanning line GL or the common line CL which allows the scanning line GL or the common line CL to be covered with the width of the first black matrix BM1 in the Y direction is explained.

In FIG. 2, the relationship of the first black matrix BM1 which is defined by the end peripheries of the scanning line GL and the common line CL is above-mentioned $W_{BM} < W_G + W_C + W_P$ and $W_{BM} < W_G + W_C + W_P - d1 - d2$.

However, $$d1 > (\delta W_{BM}^2 + \delta W_c^2 + \delta_{BM}^2 + \delta_c^2 + \delta a^2 + \delta b^2)^{1/2}$$

$$d2 > (\delta W_{BM}^2 + \delta W_G^2 + \delta_{BM}^2 + \delta_G^2 + \delta a^2 + \delta b^2)^{1/2}.$$

Here, it is necessary that $\delta W_{BM}$: width accuracy in the Y direction of the first black matrix BM1/2

$\delta W_c$: width accuracy in the Y direction of the common line CL/2

$\delta W_G$: width accuracy in the Y direction of the scanning line GL/2

$\delta_{BM}$: position accuracy of the first black matrix BM1

$\delta_C$: position accuracy of the common line CL $\delta_G$: position accuracy of the scanning line GL $\delta a$: misalignment quantity of the first black matrix BM1 between the first exposure time and the second exposure time (the position accuracy of the second black matrix BM2, the machine accuracy of the stage shifting and $\delta_{BM}$)

$\delta b$: alignment accuracy at the time of laminating the CF substrate and the TFT substrate to each other.

In this manner, according to this embodiment, in the boundary region of the multiple exposure which forms the black matrix using the exposure mask having a smaller size than the display region, even when a stepped-portion is generated in the Y direction of the black matrix, the stepped portion is concealed by the scanning line GL or the common line CL. Accordingly, such a stepped portion in a linear manner as explained in the above-mentioned prior art is not observed and hence, the liquid crystal display device which exhibits the high quality can be obtained.

Figure 5:
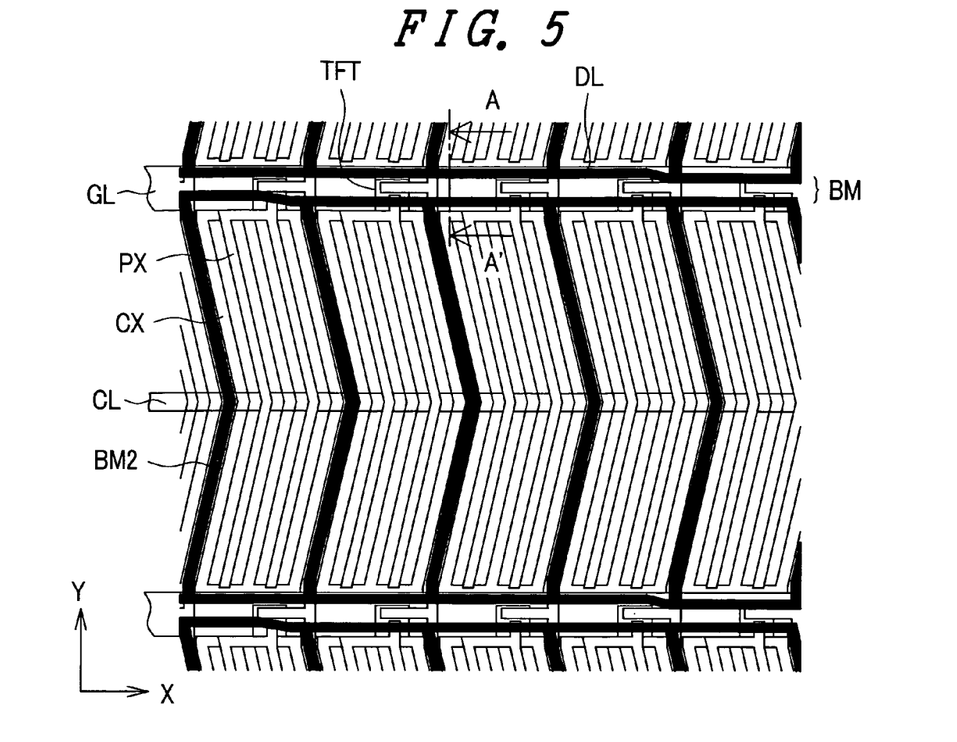
FIG. 5 is a plan view of an essential part showing an example of a shape of a black matrix in a liquid crystal panel which constitutes a liquid crystal display device of the second embodiment according to the present invention in a state that a TFT substrate is observed from a CF substrate side.
Figure 6:
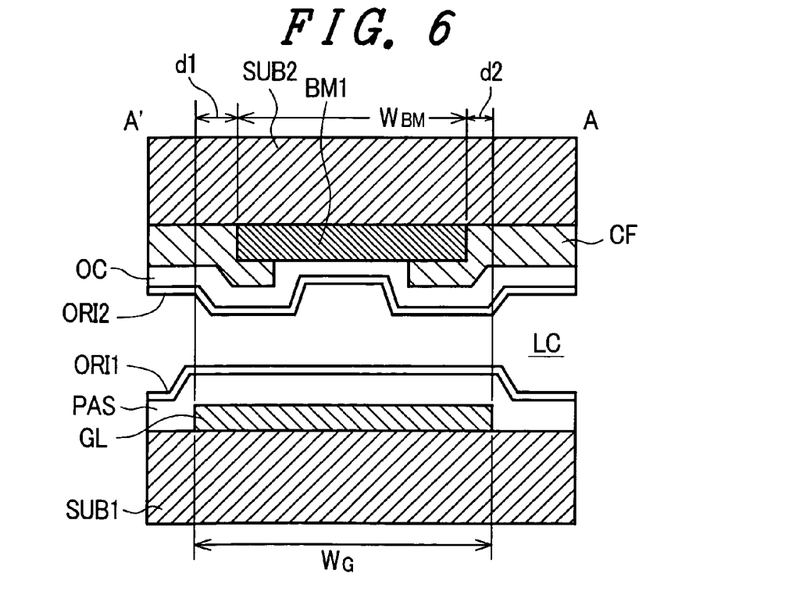
FIG. 6 is a cross-sectional view taken along a line A–A' in FIG. 5.

FIG. 5 is a plan view of an essential part showing an example of a shape of a black matrix in a liquid crystal panel which constitutes a liquid crystal display device of the second embodiment according to the present invention in a state that a TFT substrate is observed from a CF substrate side and FIG. 6 is a cross-sectional view taken along a line A–A' in FIG. 5. This liquid crystal panel adopts a method in which a common line CL is formed between two scanning lines GL arranged adjacent to each other through the pixel region in parallel. The reference symbols used in FIG. 5 and FIG. 6 which are as same as the reference symbols in FIG. 1 and FIG. 2 indicate identical functional parts. As black matrixes, a first black matrix BM1 which is positioned above the scanning lines GL and a second black matrix BM2 which defines an interval between respective color pixels in the X direction are used.

Figure 7:
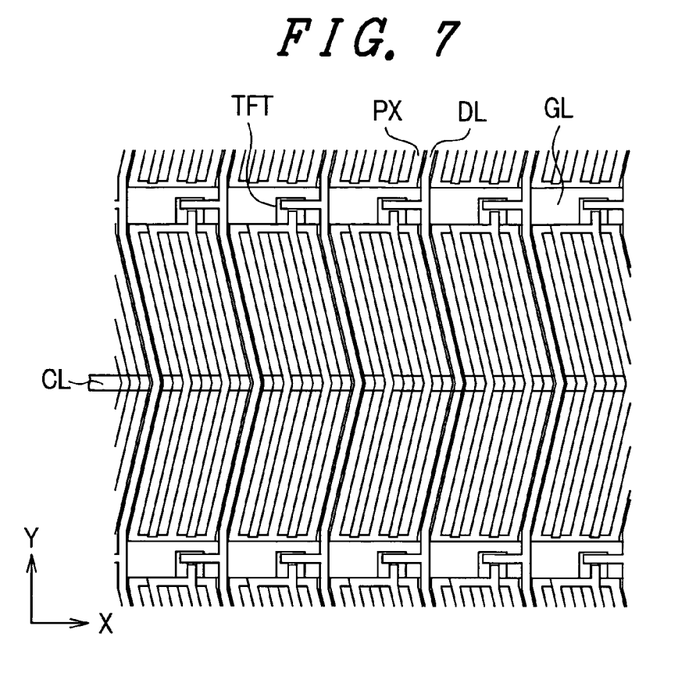
FIG. 7 is a plan view of an essential part of a main surface of the TFT substrate which constitutes the liquid crystal panel shown in FIG. 5.
Figure 8:
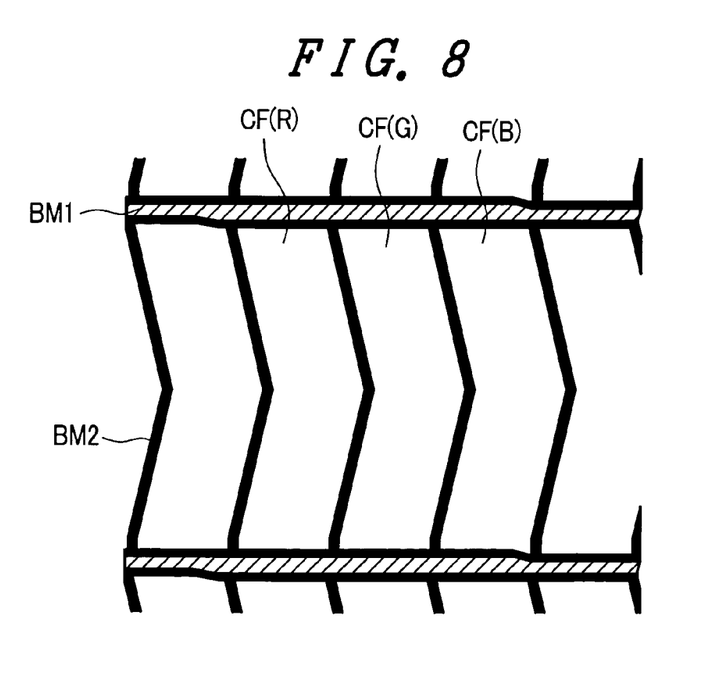
FIG. 8 is a plan view of an essential part of a multi-exposure portion similar to a multi-exposure portion shown in FIG. 15 of the main surface of the CF substrate which constitutes the liquid crystal panel shown in FIG. 4.

FIG. 7 is a plan view of an essential part of the main surface of the TFT substrate which constitutes the liquid crystal panel shown in FIG. 5. Further, FIG. 8 is a plan view of an essential part of multiply-exposed portion similarly as in FIG. 15 of the main surface of the CF substrate which constitutes the liquid crystal panel shown in FIG. 4. In FIG. 7, a pixel is constituted such that a thin film transistor TFT is arranged at a portion where the scanning line GL and the signal line DL intersect each other. In this example, the common line CL is arranged such that the common line CL traverses a region between two scanning lines GL which extend in the X direction, that is, the pixel region in the X direction. In each pixel, comb-shaped pixel electrodes PX which are driven by a thin film transistor TFT and common electrodes CX which extend from the common line CL are alternately arranged. By controlling the orientation of the liquid crystal molecules constituting the liquid crystal layer using an electric field formed between the pixel electrode PX and the common electrode CX, the light transmission for every pixel is changed and hence, the display is performed.

Similarly as mentioned above, black matrixes formed on the CF substrate SUB2 are constituted of a first black matrix BM1 (portion shown by hatching) which shields the upper layer of the scanning line GL from light and a second black matrix BM2 (portion shown by a black bold line) which shields spaces between three color pixels (respective color sub-pixels) CF(R), CF(G), CF(B) each other. The width in the Y direction of the first black matrix BM1 according to this embodiment is narrower than the width in the Y direction of the first black matrix BM1 in FIG. 15.

In this embodiment, assuming a width of the first black matrix B1 as $W_{BM}$ and a width of the signal line GL as $W_G$, the relationship $W_{BM}<W_G$ is established. As shown in FIG. 6, the first black matrix BM1 is formed narrower than the width in the Y direction of the scanning line GL provided in the TFT substrate SUB1. Accordingly, the boundary in the Y direction of a pixel between the scanning lines arranged adjacent to each other in the Y direction is defined by the end peripheries of the scanning line GL and, even when a stepped portion is generated in the Y direction in the above-mentioned boundary region of the multiple exposure, the stepped portion is concealed by the scanning line GL. Therefore, the stepped portion as explained in the above-mentioned prior art is not observed in a linear manner.

The relationship of the first black matrix BM1 which is defined by both end peripheries of the scanning line GL is set to $W_{BM}<W_G$. However, to be more specific, it is also necessary that the end peripheries of the first black matrix BM1 do not project from the end peripheries of the scanning line GL. That is, both peripheral ends of the first black matrix BM1 are arranged between both end peripheries of the scanning lines GL. Hereinafter, a specific example of the relationship of the scanning line GL which makes the scanning line GL covered with the width in the Y direction of the first black matrix BM1 is explained.

In FIG. 6, the relationship that the first black matrix BM1 is defined by the end peripheries of the scanning line GL is set as $W_{BM}<W_G$ and $W_{BM}<W_G-d1-d2$.

Provided that, $$d1>(\delta W_{BM}^2+\delta W_G^2+\delta_{BM}^2+\delta_G^2+\delta a^2)^{1/2}$$

$$d2>(\delta W_{BM}^2+\delta W_G^2+\delta_{BM}^2+\delta_G^2+\delta a^2)^{1/2}$$

Here, $\delta W_{BM}$: width accuracy in the Y direction of the first black matrix BM1/2

$\delta W_G$: width accuracy in the Y direction of the scanning line GL/2

$\delta_{BM}$: position accuracy of the first black matrix BM1

$\delta_G$: position accuracy of the scanning line GL

It is necessary that δa is the misalignment quantity of first black matrix BM1 between the first exposure time and the second exposure time In this manner, according to this embodiment, in the boundary region of the multiple exposure which forms the black matrix using the exposure mask having a smaller size than the display region, even when a stepped portion is generated in the Y direction of the black matrix, the stepped portion is concealed by the scanning line GL. Accordingly, such a stepped portion in a linear manner as explained in the above-mentioned prior art is not observed and a high quality liquid crystal display device can be obtained.

Figure 9:
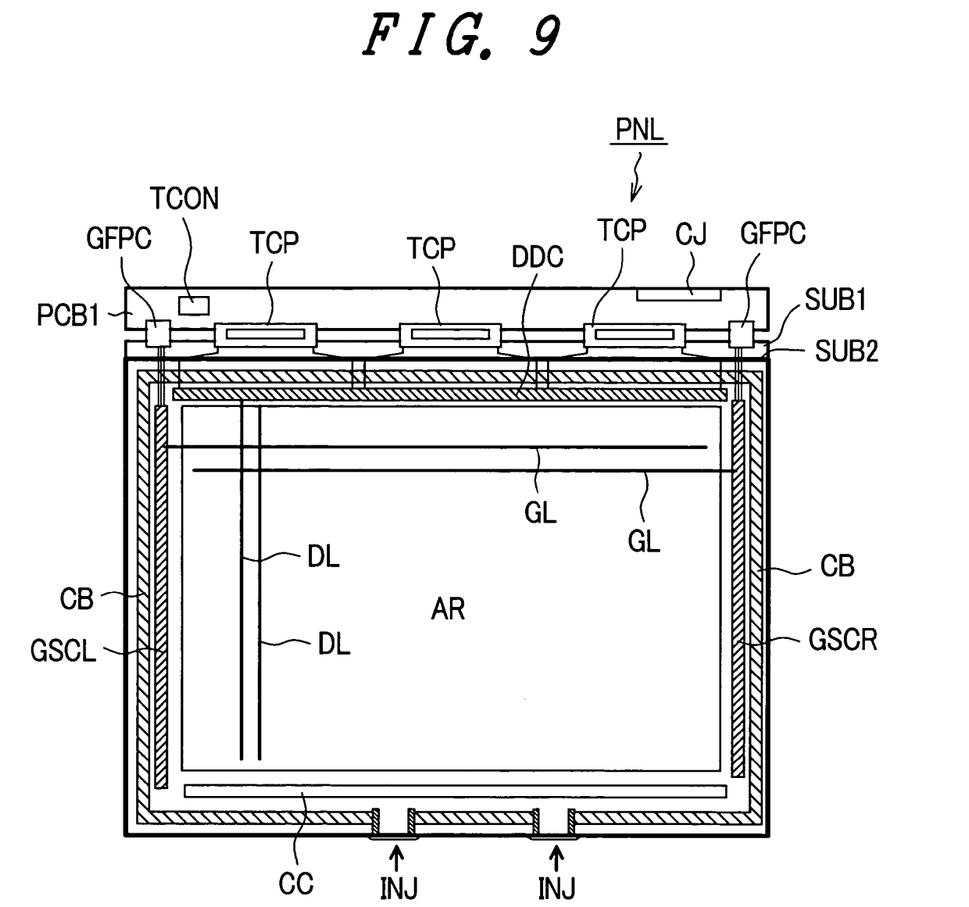
FIG. 9 is a plan view for explaining a constitutional example around the liquid crystal panel which constitutes the liquid crystal display device of the present invention.

FIG. 9 is a plan view explaining a constitutional example around the liquid crystal panel which constitutes the liquid crystal display device according to the present invention. In this liquid crystal panel, a liquid crystal layer is sealed in a lamination gap between the TFT substrate SUB1 and the CF substrate SUB2 and the vicinity of the both substrates are sealed using a sealing agent CB. In one portion of the sealing agent CB, a liquid crystal filling opening INJ is formed and, after laminating the TFT substrate SUB1 and the CF substrate SUB2, liquid crystal is filled through the liquid crystal filling opening INJ and the liquid crystal filling opening INJ is sealed with a sealant equal to a sealing agent or a proper amount of sealant.

One side (long side) of the TFT substrate SUB1 slightly projects from the CF substrate SUB2 and a driving circuit or the like is mounted thereon. Most of the main surface of the TFT substrate SUB1 forms a display region AR together with the CF substrate SUB2. A signal line driving circuit DDC which supplies video signals to the signal lines DL is mounted on the above-mentioned one side of the display region AR, while scanning line driving circuits GSCR which applies scanning signals to the scanning lines GL are formed on both of the other sides arranged adjacent to the one side. Here, in FIG. 9, only two signal lines DL and only two scanning lines GL are shown.

To the above-mentioned projecting portion of one side of TFT substrate SUB1, flexible printed circuit boards TCP (Tape Carrier Package) TCP which mount driving circuit chips supplying video signals to the signal line driving circuit DDC are connected. The circuit board TCP has an input end thereof connected to the driving circuit board PCB1 and an output end thereof connected to a terminal line which is patterned on the TFT substrate SUB1. In the driving circuit board PCB1, a display control circuit chip such as a timing controller TCON or the like and other electric parts are mounted. The reference symbol GFPC indicates a printed wiring board which applies the scanning signal from the driving circuit board PCB1 to the scanning line driving circuit GSCR and is flexible similarly as a flexible circuit board TCP.

Here, external circuits, other circuits and constitutional members which constitute the liquid crystal display device are not shown in the drawing. Various signals and voltages from the external circuits are inputted from a connector CJ which is mounted on the driving circuit board PCB1. The flexible circuit board TCP and the printed wiring board GFPC are bent together with the driving circuit board PCB1 to the back side of the TFT substrate SUB1 and are mounted on the liquid crystal display device explained hereinafter.

Figure 10:
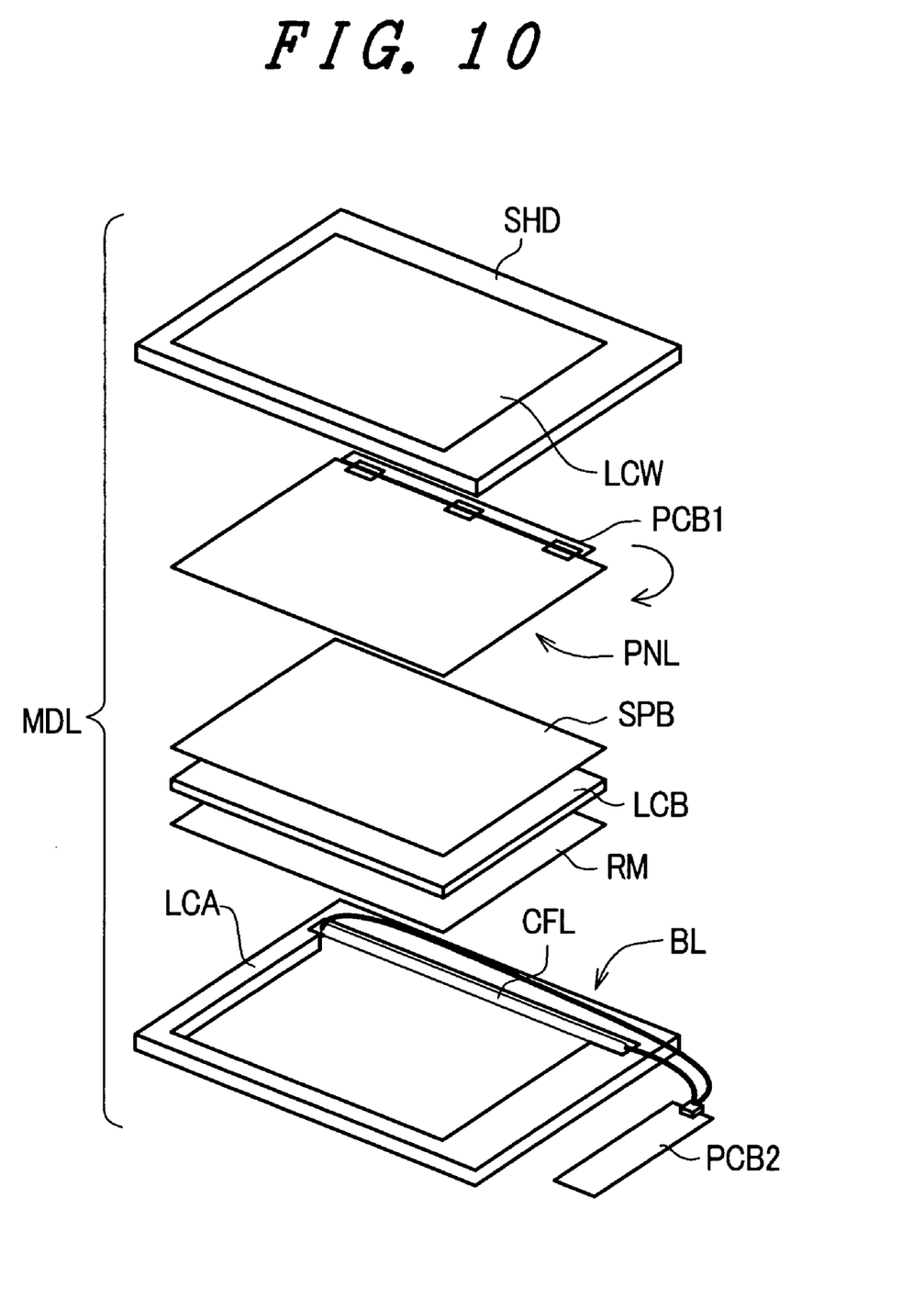
FIG. 10 is a developed perspective view for explaining a whole constitutional example of the liquid crystal display device of the present invention.

FIG. 10 is a developed perspective view for explaining a whole constitutional example of the liquid crystal display device according to the present invention. A backlight device is mounted on the back of the above-mentioned liquid crystal panel PNL and the front surface side is protected with a shield casing SHD having a window LCW which exposes the display region AR. The backlight BL includes a backlight casing (a lower case) LCA, a cold cathode fluorescent lamp CFL, a light guide body LCB, a reflection plate RM, a diffusion plate SPB, and a power circuit board PCB2 which mounts an inverter power circuit which supplies power to the cold cathode fluorescent lamp CFL thereon. Then, the reflection plate RM, the light guide body LCB, the spreading plate SPB and the cathode fluorescent lamp CFL are stored in the backlight casing LCA. To the backlight casing LCA, the liquid crystal panel PNL having a constitution of the present invention explained in the above-mentioned embodiments is overlapped. Then, the liquid crystal panel is covered with the shielding casing SHD and these parts are integrally formed. Nails or hooks are provided with the periphery of the shield casing SHD and the backlight casing LCA and both of the shield casing SHD and the backlight casing LCA are fixed together by engagement of these nails or hooks.

Here, the liquid crystal display device shown in FIG. 10 uses a so-called side-edge type backlight in which the cold cathode fluorescent lamp CFL is arranged on the side surface of the light guide body LCB. However, the liquid crystal display device according to the present invention is not limited to such a constitution, can also use a so-called direct backlight type in which a plurality of cold cathode fluorescent lamps CFL or a light sources constituted of a large number of light emitting diodes are directly arranged on a back surface of the liquid crystal panel and can be applied to a so-called front light type liquid crystal display device in which a light source is arranged on a front side of the liquid crystal panel PNL, and further, to a liquid crystal display device of a method in which an external light is used as a light source.

The liquid crystal display device according to the present invention explained hereinabove can be used as a display device such as a monitor of a notebook type personal computer or a desk top type personal computer, a mobile telephone and other various devices.

As explained hereinabove, according to the present invention, even when a stepped portion is generated in a boundary (multiply-exposed portion) of a black matrix which is formed by the 1:1 exposure twice or more, the stepped portion is covered with the scanning lines or the scanning lines and the common lines and hence, the influence to a display which is generated when the black matrix is formed by an exposure mask having a size smaller than the size of the liquid crystal panel can be eliminated whereby it is possible to provide a high quality liquid crystal display device.

What is claimed is:

1. A liquid crystal display device including a liquid crystal panel which sandwiches a liquid crystal layer between main surfaces of a pair of substrates which is formed of one substrate and the other substrate, and a drive circuit which displays an image on the liquid crystal panel, wherein on a main surface of one substrate of the pair of substrates, a plurality of pixels are formed, wherein the pixels are constituted of signal lines which extend in a first direction and are arranged in parallel in a second direction which intersects the first direction, scanning lines which extend in the second direction and are arranged in parallel in the first direction, common lines which are formed in parallel with the scanning lines, and pixel circuits which are formed on respective intersecting portions of the signal lines and the scanning lines, the pixel circuit includes an active element, pixel electrodes which are driven by the active elements and a common electrode which is arranged to face the pixel electrode in an opposed manner and is connected with the common line, the common lines are arranged close to the scanning lines, on a main surface of the other substrate of the pair of substrates which faces a main surface of one substrate in an opposed manner, a light shielding film and color filters of a plurality of colors which are defined by the black matrix are formed, the light shielding film includes first light shielding portions which extend in the extending direction of the scanning lines and are positioned above the scanning lines and the common line, and second light shielding portions which extend in the extending direction of the signal lines and are positioned between the color filters of the plurality of colors, and assuming a width of the scanning line as WG, a width of the common line as WC, an interval between the scanning line and the common line as WP, and a width of the first light shielding portion as WBM, the relationship WBM<WG+WC+WP is established.

2. A liquid crystal display device according to claim 1, wherein both end peripheries of the first light shielding portion are positioned between an end periphery of the scanning line at a side opposite to the common line and an end periphery of the common line at a side opposite to the scanning line.

3. A liquid crystal display device according to claim 1, wherein the pixel electrode which constitutes the pixel has a comb shape which extends in the extending direction of the signal lines.

4. A liquid crystal display device according to claim 3, wherein the common electrode which constitutes the pixel extends adjacent to and in parallel with the pixel electrode.

5. A liquid crystal display device according to claim 1, wherein the active element is a thin film transistor.

* * * * *